March 10, 1925.
J. J. WANKO
1,529,519
MOLD FOR MAKING BOTTLES
Filed May 23, 1921  4 Sheets-Sheet 1
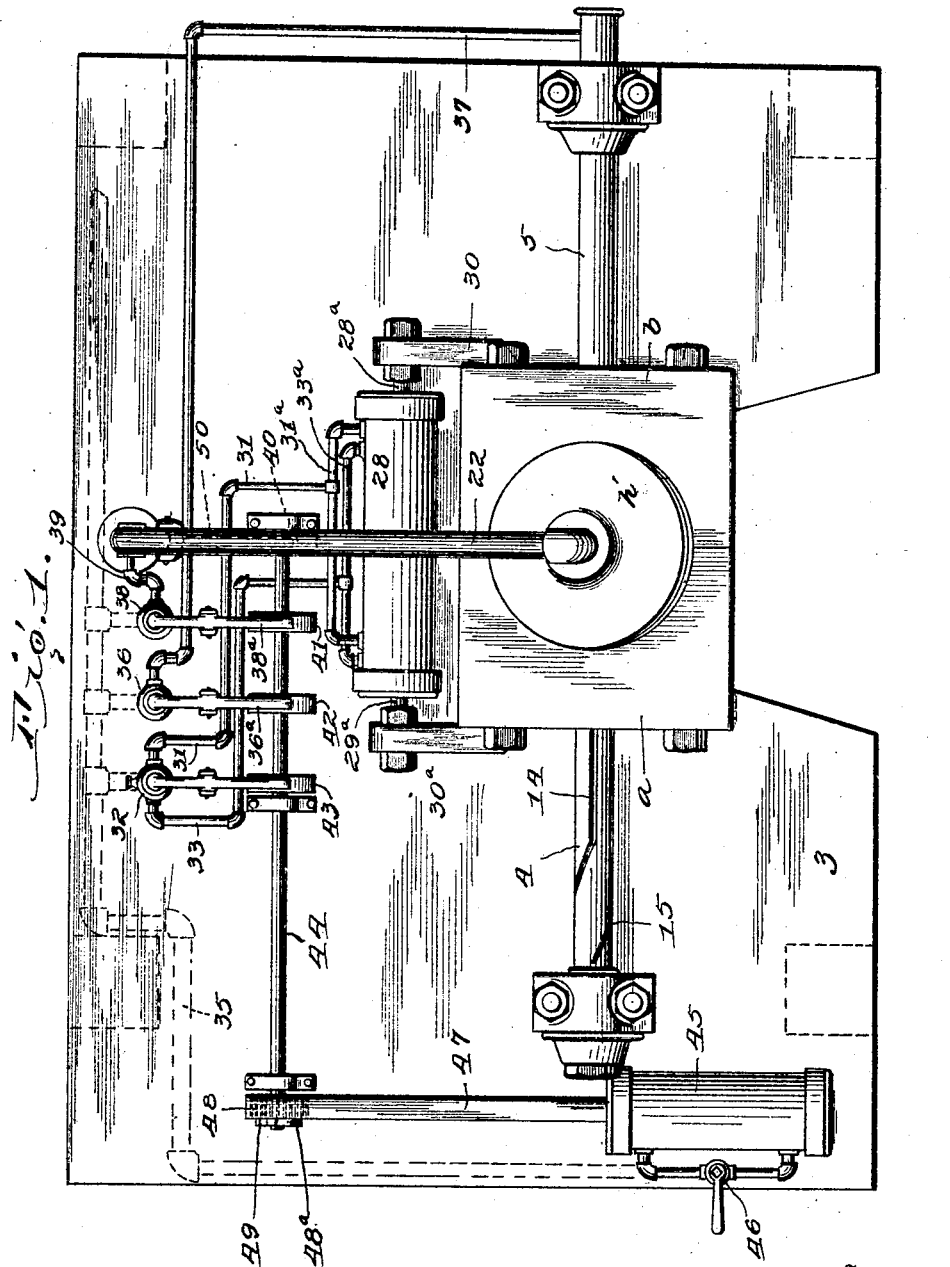
Inventor
John J. Wanko.
By Robert Walton
Attorney

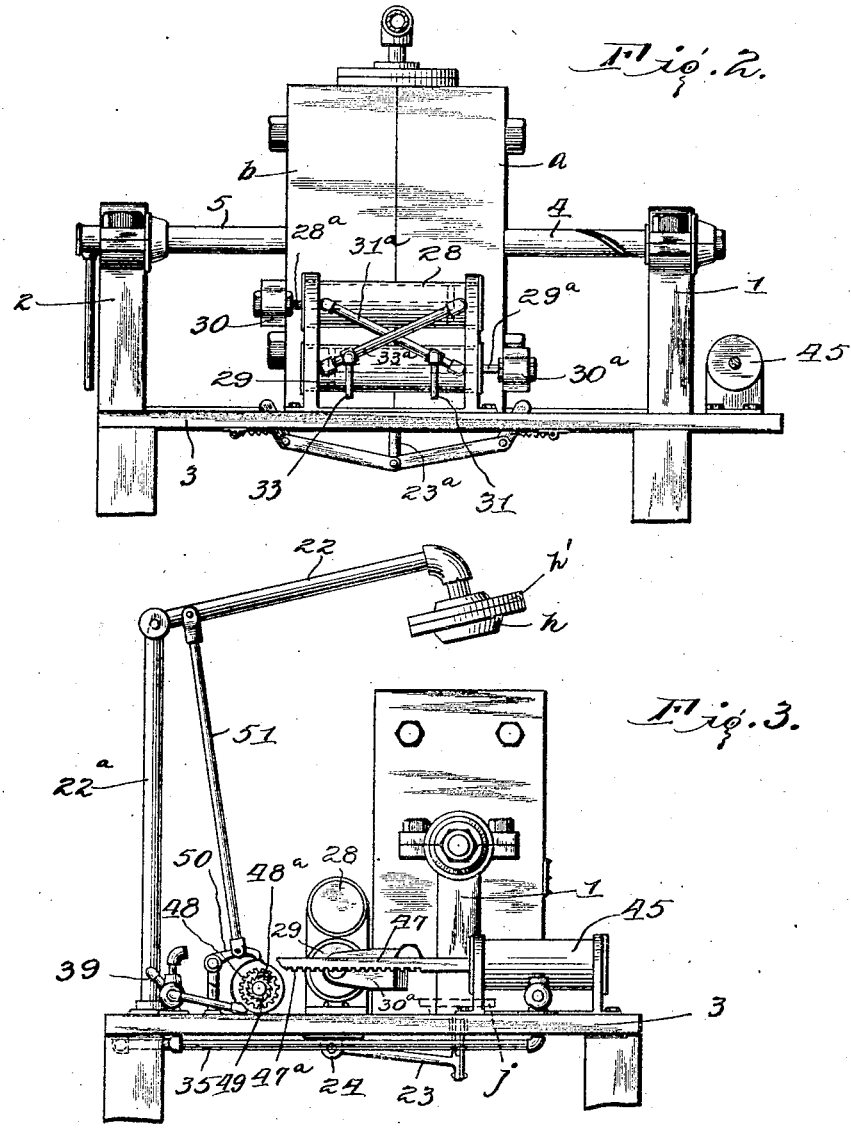

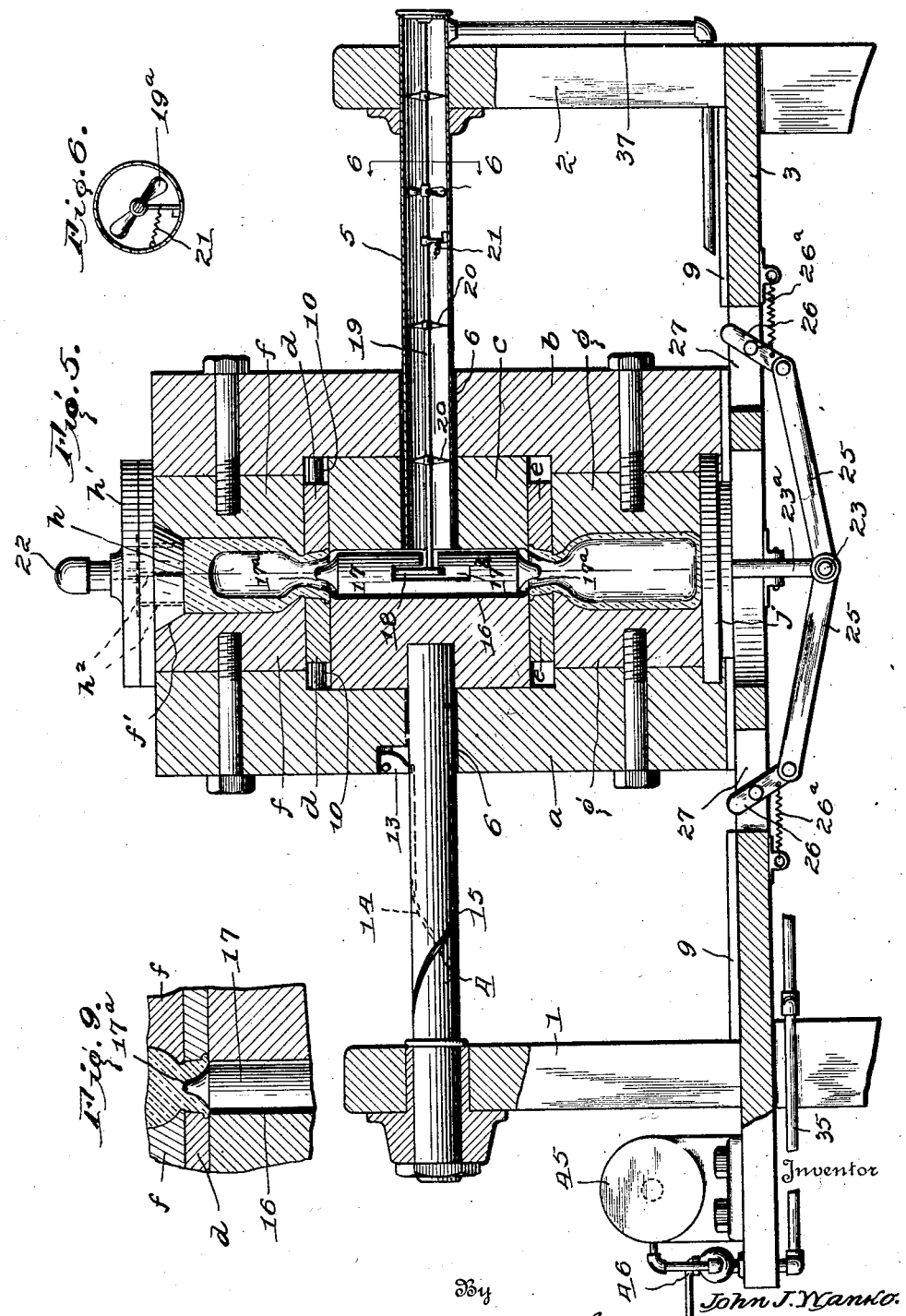

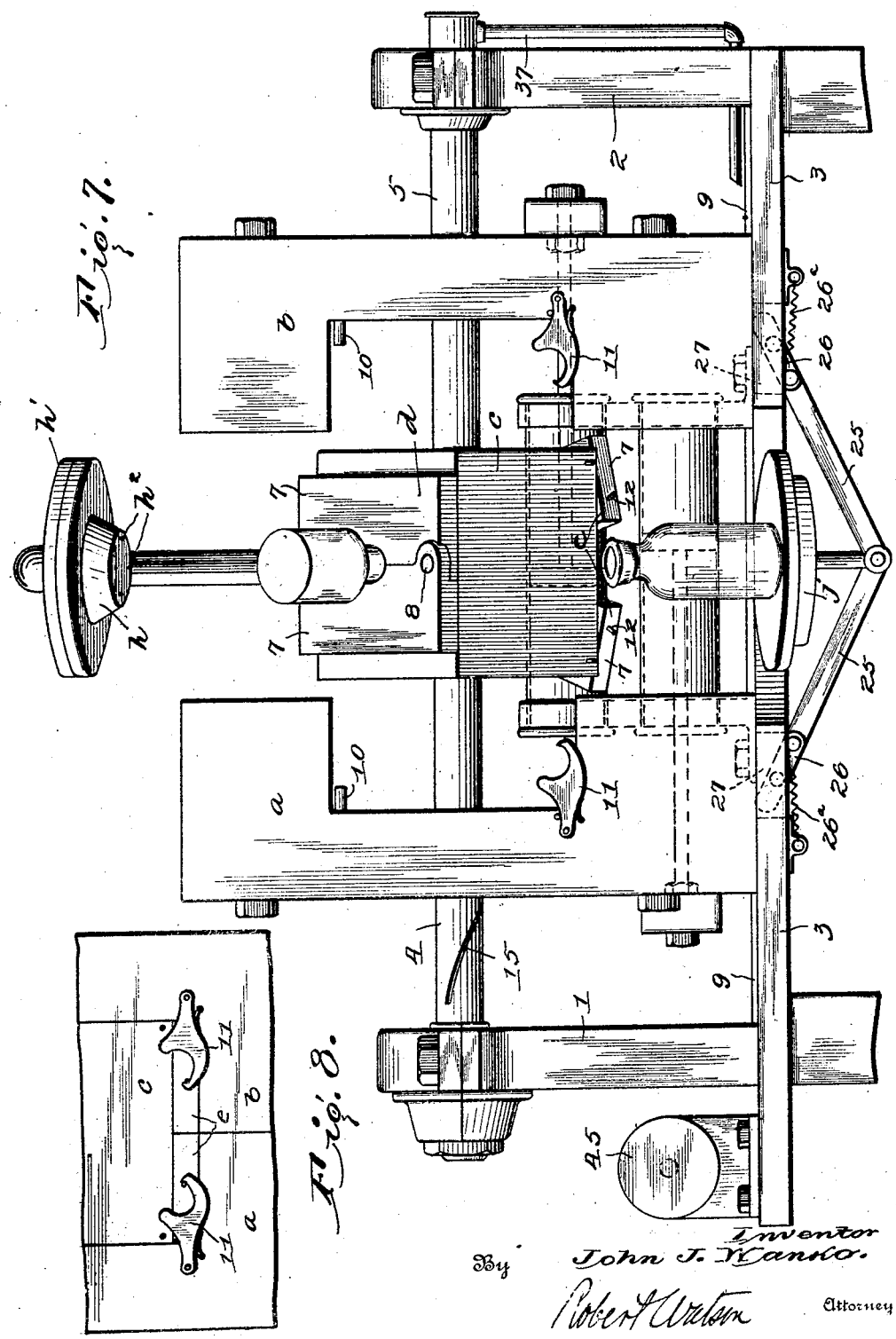

Patented Mar. 10, 1925.

1,529,519

UNITED STATES PATENT OFFICE.

JOHN J. WANKO, OF WESTPORT, MARYLAND.

MOLD FOR MAKING BOTTLES.

Application filed May 23, 1921. Serial No. 471,541.

*To all whom it may concern:*

Be it known that I, JOHN J. WANKO, a citizen of the United States, residing at Westport, in the city of Baltimore and State of Maryland, have invented certain new and useful Improvements in Molds for Making Bottles, of which the following is a specification.

This invention relates to improvements in machines for molding glass bottles, and it comprises means for forming each bottle by two successive operations, in a pair of molds, in one of which the mouth and neck of one bottle is formed while the body of another bottle is being finished in the other mold, the apparatus including means for releasing the finished bottle from the latter mold and for transferring the unfinished bottle from the former to the latter mold upon the opening of the mold parts. In carrying out the invention, I provide a rotatable mold carrier, which turns about a horizontal axis and is provided on its opposite sides with mold parts for forming the mouths and necks of the bottles, and two sliding mold carriers on opposite sides of the rotatable carrier and movable toward and from the same, these sliding carriers having patterns for forming mold cavities, above and below the rotatable carrier, to give shape to the bodies of the bottles. When the mold cavities are closed, molten glass is poured into the upper cavity and air under pressure is admitted to the upper part of said cavity to force the glass downward into the mouth-forming patterns on the rotatable carrier. Air is then admitted through the rotatable carrier to the interior of the bottle neck in the upper cavity, to partly form the body of the bottle, and simultaneously into a partly formed bottle, previously transferred to the lower cavity, to finish the body of the latter bottle. The sliding mold carriers then move apart to open the upper and lower mold cavities and allow the rotatable mold carrier to turn, and during this opening movement of the sliding carriers the finished bottle is released from the lower cavity, and the unfinished bottle in the upper cavity is swung with the rotatable carrier into position to be enclosed in the lower cavity when the sliding carriers are brought together. When the cavities are again closed, more glass is poured into the upper cavity and the operations are repeated, the bottle mouth and neck of one bottle being finished in the upper cavity, while the body of another bottle is being finished in the lower cavity.

In the accompanying drawing,

Fig. 1 is a top plan view of the apparatus;

Fig. 2 is a rear elevation of the same;

Fig. 3 is an end elevation of the apparatus, looking from left to right in Fig. 1;

Fig. 4 is a view showing the cams which operate the air valves and illustrating the relation of the several cams to one another;

Fig. 5 is a central vertical section through the molds, the molds parts being shown in closed positions;

Fig. 6 is a section on the line 6—6 of Fig. 5;

Fig. 7 is a front elevation of the apparatus, showing the mold parts separated and the rotatable mold carrier partly turned from the molding position;

Fig. 8 is a detail view showing the lower mold parts on the rotatable carrier closed and engaged by the latches on the sliding carriers; and, Fig. 9 is a detail view showing the plug in the rotatable carrier in its raised position, closing the lower end of the upper mold.

Referring to the drawing, 1 and 2 indicate posts or standards mounted on a suitable base 3 and supporting shafts or trunnions 4 and 5, respectively, which trunnions extend through openings 6 in slidable mold carriers $a$ and $b$, and into a rotatable mold carrier $c$ which is arranged between the slidable carriers and is supported on the trunnions. The trunnion 4 is fixed to the carrier $c$ and rotatable in a bearing in the post 1, and the trunnion 5, which is hollow, is fixed to the post 2 and has a bearing in said carrier. The rotatable carrier is cubical in form and has on two of its opposite faces mold patterns $d$ and $e$, in which the mouths of the bottles are formed. These patterns are alike, and, as best shown in Fig. 7, each consists of two parts 7, hinged together and secured to the block $c$ by a hinge-pin 8. The arrangement is such that the block may be turned to reverse the positions of the patterns by giving the trunnion 4 a half turn.

The mold carriers $a$ and $b$, which are alike in construction, are slidably mounted on suitable guideways 9 on the base, and are movable toward and from the carrier $c$, to close and open the mold. Each of the slidable carriers comprises an elongated block, standing upright on the base, and having the opening 6 to receive one of the trunnions, and above and below the rotatable carrier the slidable carriers are provided with complementary mold parts, or patterns $f, f$, and $g, g$, for giving shape to the bodies of the bottles. The carriers $a$ and $b$ are provided with pins or projections 10 below the mold parts $f, f$, for engaging and closing the mold parts $d$ or $e$, whichever may be uppermost, when said carriers are brought together to close the mold. For opening the mold parts $d$ or $e$, whichever may be lowermost, when the slidable carriers are moved apart, I provide spring-pressed fingers or catches 11, 11, on said carriers, adapted to hook under pins 12, projecting from the free ends of the mold parts 7 when the mold is closed, and to pull outwardly on said pins and separate said ends when the sliding carriers are moved apart.

The carriers $a$ and $b$ are moved apart and together by pneumatic pressure, as hereinafter described, and in moving apart, after they have separated sufficiently to allow the carrier $c$ to turn, the shaft or trunnion 4 and the latter carrier are given a semi-revolution by means of a pawl 13, pivoted to the carrier $a$ and adapted to engage a groove 14 or a groove 15 in said trunnion, said grooves having straight portions at their inner ends and having spiral portions at their outer ends, which latter portions cause the trunnion to turn when the pawl moves outwardly in the groove. During the return or closing movement of the carriers $a$ and $b$, the pawl rides out of the groove which it engaged on the outward movement and into the straight part of the other groove so that the carrier $c$ is not turned during the closing movements of the carriers $a$ and $b$.

The rotatable mold carrier has a central bore 16, extending at right angles to the trunnions, and in line with the openings in the hinged mold parts $d$ and $e$. In this opening is arranged a loosely fitting plug 17, which has its ends tapered as shown at $17^a$ and adapted to fit within the openings in the mold parts and form a pattern for the interior of the bottle mouths. This plug rests upon a cam or eccentric 18, arranged within a slot $17^b$ in the plug and secured to a shaft 19 which is journaled in spiders 20 within the hollow trunnion 5, and extends into said slot. Normally, when the mold is closed, the upper end of the plug fits into the opening in the hinged mold which is uppermost, as shown in Fig. 9, so that when the glass is poured into the mold, these parts will give shape to the mouth of the bottle when air pressure is applied above the glass. A spring 21, atached to an arm on the shaft which carries the eccentric 18, constantly tends to hold the plug in its uppermost position. The shaft 19 is provided with vanes $19^a$, and, at a certain point in the operation of blowing the bottles, air is admitted through the hollow trunnion to the molds, and in its passage strikes the vanes and causes the shaft and eccentric to turn and lower the plug 17 to the position shown in Fig. 5. The air then flows past the plug in both directions into the partly formed bottles in the upper and lower molds.

The upper mold parts $f, f$, have a conical opening $f'$, adapted to receive a conical plug $h$, which closes this opening. The plug has a flange $h'$, adapted to fit against the parts $f, f$, and it has perforations $h^2$, through which air may pass into the cavity of the mold from the air pipe 22 to which the plug is attached. The air pipe and plug are movable vertically to remove and seat the plug, as hereinafter explained.

The closure for the lower end of the lower mold comprises a disk or plate $j$, which is mounted upon an upright $23^a$, at the end of a lever 23, which lever is pivoted to the under side of the base, at the rear of the mold, in a suitable bearing 24. The free end of the lever is supported by two pairs of toggle levers consisting of links 25, pivoted to the lever 23 and extending in opposite directions therefrom and connected to other levers 26 which are centrally pivoted to the base and project slightly above the base through slots 27. Springs $26^a$, connected to the lower arms of the latter levers and to the base, normally tend to break the toggles and hold the plate $j$ against the bottom of the mold parts $g, g$, to close the cavity in the lower mold. The levers 26 project into the path of movement of the sliding mold carriers $a$ and $b$, and when the latter are moved apart to open the molds, these parts engage and rock the levers 26 to straighten the toggles and thereby lower the lever and the mold plate $j$, as illustrated in Fig. 6. When the carriers move to their closed positions, the levers 26 are released and the springs $26^a$ cause the mold plate to move up and close the bottom of the lower mold.

Any suitable means may be employed for moving the slidable mold carriers apart and for raising and lowering the plug $h$. For moving the slidable carriers, I have shown two cylinders 28 and 29, horizontally arranged one above the other, at the rear of the carriers, and provided with pistons and piston rods, the piston rod $28^a$ of the cylinder 28 being connected to the rearwardly extending bracket 30 on the carrier $b$, and the piston rod $29^a$, associated with the cylinder 29, extending in the opposite direction and being connected to the carrier $a$ by a bracket $30^a$. The carriers $a$ and $b$ are normally held together by air under pressure admitted to opposite ends of the cylinders from a supply pipe 35, through a pipe 31, leading from an automatically controlled air valve 32 to a cross pipe 31ª, which is connected to the opposite ends of the cylinders. For moving the carriers apart, the air is exhausted from the pipe 31, at the valve 32, and admitted to the pipe 33, which leads to a cross pipe 33ª, connected to both cylinders, at the ends opposite to those of which the pipe 31ª is connected.

Air is admitted to the hollow trunnion 5, from the supply pipe 35, through an automatically controlled valve 36, and a pipe 37 connecting said valve with the trunnion, and air is admitted from the supply pipe to the pipe 22 and the perforated plug $h$ through an automatically controlled valve 38, and a connection 39 from said valve to the hollow standard 22ª upon which the pipe 22 is hinged.

These various valves and the movements of the swinging pipe 22 are controlled by cams 40, 41, 42 and 43, on a cam shaft 44, which is given one complete turn for each cycle of operations. As a means for operating the shaft, I have shown a cylinder 45, the ends of which are connected through a hand controlled valve 46 to the air supply pipe 35 so that by turning the valve in one direction, the piston rod 47 will be moved outward the full length of its stroke, and by turning the valve in the opposite direction the piston will be withdrawn. This piston rod has teeth 47ª and constitutes a rack bar which engages a gear 48 on the cam shaft. This gear is loosely mounted on the shaft and carries a pawl 48ª, which engages a ratchet wheel 49, secured to the shaft. With this arrangement of parts, when the rack bar is forced rearwardly the cam shaft is turned, but when the rack bar is withdrawn the cam shaft remains stationary. The cam 40 raises and lowers the hollow arm 22 by means of a lever 50, bearing upon said cam and connected to the arm by a link 51. The cam 41 actuates a lever 38ª to operate the valve 38 and control the admission of air to said arm. The cam 42 operates a lever 36ª, which controls the valve 36 for admitting air to the hollow trunnion, and the cam 43 operates a lever 32ª which controls the valve 32 for admitting air to the cylinders which move the sliding mold carriers.

In operation, the reciprocating mold carriers being held by pneumatic pressure in position to close the molds and the plug in the rotatable carrier being held in its upper position by the eccentric on which it rests, glass is poured into the upper mold cavity and the controlling valve 46 is moved to admit air to the cylinder 45 and the rack bar connected with the piston in the cylinder is moved rearwardly and gives one rotation to the cam shaft. During this rotation, the plug $h$ is first lowered to close the upper mold cavity and air is then admitted for a moment through this plug to force the glass down into the mouth-forming mold patterns on the rotatable carrier. Immediately thereafter, air is admitted through the hollow trunnion to the interior of the rotatable carrier and in its passage, the air, striking the vanes on the shaft 19, causes this shaft and the eccentric thereon to turn and lower the plug in the rotatable carrier so that the air may blow into the upper mold cavity and partly form a bottle therein, and at the same time the air may blow into the lower mold cavity to finish a partly formed bottle previously transferred to said cavity. After the air has blown into both cavities the arm carrying the plug $h$ lifts clear of the upper cavity. The sliding mold carriers then move apart, opening both mold cavities. During this opening movement, the annular mold pattern on the lowermost side of the rotatable carrier is pulled open, releasing the finished bottle in the lower cavity, and the lever on which the bottom plate for this cavity is supported rocks downward allowing the bottle to be removed or to slide off, and the rotatable carrier is inverted, bringing the partly formed bottle from the upper cavity into position to be enclosed in the lower cavity when the reciprocating carriers are brought together. The reciprocating carriers then move together to close the mold cavities and during this closing movement, the annular pattern on the rotatable carrier which was opened is again closed. The parts are then in position for another operation.

What I claim is:

1. A bottle molding machine comprising a carrier rotatable about a horizontal axis and having on one side mold parts for forming the mouths of bottles, reciprocating mold carriers having mold parts adapted to form mold cavities above and below the rotatable carrier, and means for automatically inverting the rotatable carrier while the reciprocating carriers are moving apart, and for permitting the rotatable carrier to remain stationary while the reciprocating carriers are moving toward one another.

2. In a bottle molding machine, a carrier rotatable about a horizontal axis and having on opposite sides mold parts for forming the mouths of bottles, reciprocating mold carriers having mold parts adapted to form mold cavities above and below the rotatable carrier, and means for blowing air into the top of the upper cavity and then, through the rotatable carrier, into both cavities.

3. In a bottle molding machine, a carrier rotatable about a horizontal axis and having on opposite sides mold parts for forming the mouths of bottles, reciprocating mold carriers having mold parts adapted to form mold cavities above and below the rotatable carrier, means for blowing air into the top of the upper cavity and then, through the rotatable carrier, into both cavities, and means for inverting the rotatable carrier when the reciprocating carriers are moved apart.

4. In a bottle making machine, oppositely reciprocating carriers having mold parts adapted to form upper and lower mold cavities, a rotatable carrier between said reciprocating carriers and having on its opposite sides separable mold patterns, adapted to register with said cavities, for forming the mouths of bottles, means for opening the lowermost of said patterns when the reciprocating carriers are moved apart, means for inverting the rotatable carrier, and means for closing said patterns when the reciprocating carriers are moved toward one another.

5. In a bottle making machine, oppositely reciprocating carriers having mold parts adapted to form upper and lower mold cavities, a rotatable carrier between said reciprocating carriers and having on its opposite sides separable mold patterns, adapted to register with said cavities, for forming the mouths of bottles, latches for connecting the lowermost of said patterns to the reciprocating carriers when the latter are moved toward one another, said latches adapted to open and then become disengaged from said lowermost patterns when the reciprocating carriers are moved apart, means for inverting said rotatable carrier, and means for closing said patterns after the last mentioned carrier has been inverted.

6. In a bottle-making machine, reciprocating carriers having patterns for forming upper and lower mold cavities, a rotatable carrier between said reciprocating carriers and having on opposite sides separable annular mold parts adapted to register with both of said cavities, a plug movable in the rotatable carrier and adapted to cooperate with the annular mold part which is uppermost to form a mold for the bottle mouths, means for blowing air into the top of the upper cavity, means for then lowering said plug and for blowing air through the rotatable carrier into both cavities, and means for inverting the rotatable carrier when the reciprocating carriers are moved apart.

7. In a bottle-making machine, a mold carrier rotatable about a horizontal axis and having annular mold parts at opposite sides of its axis, said carrier having an opening therethrough, a plug in said opening and having its ends shaped to fit into said mold parts, means for holding said plug normally in position to close the mold part which is uppermost, reciprocating carriers having parts for forming mold cavities above and below the rotatable carrier, means for blowing air into the top of the upper cavity, means for then lowering said plug and for blowing air past the plug into both cavities, means for moving the reciprocating carriers apart, and means for inverting the rotatable carrier.

8. In a bottle-making machine, a mold carrier rotatable about a horizontal axis and having annular mold parts at opposite sides of its axis, said carrier having an opening therethrough, a plug in said opening and having its ends shaped to fit into said mold parts, a hollow trunnion communicating with said opening, a shaft journaled in said trunnion and having vanes, an eccentric on said shaft normally holding said plug in an upper position, reciprocating carriers having parts for forming mold cavities above and below the rotatable carrier, means for blowing air into the top of the upper cavity, means for blowing air through said trunnion, past said vanes and plug into both cavities, means for moving the reciprocating carriers apart, and means for inverting the rotatable carrier.

In testimony whereof I affix my signature.

JOHN J. WANKO.